(12) United States Patent
Marin

(10) Patent No.: US 7,081,212 B2
(45) Date of Patent: Jul. 25, 2006

(54) SOLID FREE-FLOWING PHOSPHONATE COMPOSITION

(75) Inventor: Bernard Marin, Wavre (BE)

(73) Assignee: N.V. Solutia Europe S.A., Brussels (BE)

( * ) Notice: Subject to any disclaimer, the term of this patent is extended or adjusted under 35 U.S.C. 154(b) by 114 days.

(21) Appl. No.: 10/485,316

(22) PCT Filed: Aug. 1, 2002

(86) PCT No.: PCT/EP02/08792

§ 371 (c)(1),
(2), (4) Date: Jan. 29, 2004

(87) PCT Pub. No.: WO03/011773

PCT Pub. Date: Feb. 13, 2003

(65) Prior Publication Data

US 2004/0238451 A1    Dec. 2, 2004

(30) Foreign Application Priority Data

Aug. 1, 2001    (EP) .................................. 01202928

(51) Int. Cl.
*C02F 5/14*    (2006.01)
(52) U.S. Cl. ...................... 252/180; 210/700; 252/181; 562/12
(58) Field of Classification Search ................ 210/699, 210/700; 252/180, 181; 562/11, 12, 16
See application file for complete search history.

(56) References Cited

U.S. PATENT DOCUMENTS

| | | | |
|---|---|---|---|
| 3,346,488 A | | 10/1967 | Irani et al. |
| 3,613,788 A | | 10/1971 | Kautsky |
| 3,714,067 A | * | 1/1973 | King et al. ............. 252/389.22 |
| 3,880,764 A | | 4/1975 | Donham |
| 5,124,046 A | * | 6/1992 | Sherwood et al. .......... 210/699 |
| 5,141,655 A | | 8/1992 | Hen |
| 6,409,825 B1 | * | 6/2002 | Yu et al. ...................... 106/776 |
| 6,527,983 B1 | * | 3/2003 | Stewart et al. .............. 252/387 |

FOREIGN PATENT DOCUMENTS

EP    0 822 270    2/1998

* cited by examiner

*Primary Examiner*—Peter A. Hruskoci
(74) *Attorney, Agent, or Firm*—Morgan Lewis & Bockius LLP

(57) ABSTRACT

Solid free-flowing compositions of a magnesium salt of bis(hexamethylene)triamino penta(methylenephosphonic) acid are disclosed. The compositions exhibit desirable scale inhibitor properties and can be used in water treatment. In addition, a method of scale control is disclosed using the magnesium phosphonic acids under ambient conditions of relative humidity of at least 30% as can apply under subtropical or tropical conditions of high relative humidity. The preferred molar ratios of magnesium to phosphonic acid are in the range of from 1:1 to 3:1.

4 Claims, No Drawings

SOLID FREE-FLOWING PHOSPHONATE COMPOSITION

This invention relates to a solid free-flowing composition consisting essentially of a magnesium salt of bis(hexamethylene)triamino penta(methylenephosphonic) acid, having a molar ratio of magnesium to phosphonic acid of from 1:1 to 5:1. The phosphonate magnesium salt exhibits scale inhibitor properties and the composition can be used beneficially in water treatment. In a preferred embodiment, the invention contemplates a method of scale control under ambient conditions of relative humidity of at least 30% as can apply under subtropical or tropical conditions of high relative humidity.

Organic phosphonates, including polyamino species, are old in the art and have been used in various applications such as industrial water treatment, detergent and scale inhibition, particularly barium hardness control in connection with off shore marine oil drilling. Bis(hexamethylene)triamino pentamethylene phosphononic (BHMT) acid and certain salts are known from U.S. Pat. No. 3,613,788. The structural chemical formula of BHMT can be found in that US patent at the top of column 2. Shiliang He et al., *Water Soluble Polymers*, edited by Amjad, Plenum Press, New York 1998, pages 163–171, also relates to the inhibition of mineral scale precipitation by polymers. The polymers can be represented by a large variety of species including polyacrylates and their derivatives and polyphosphonates including polyamino species such as BHMT. Shiliang He et al., Langmuir 1996, 1901–1905 describe a mathematical inhibitor model for barium sulfate scale control thereby reporting, in particular, the measured inhibition kinetics of barium sulfate nucleation with BHMT and several other polyphosphonate and polyacrylate inhibitors. Zieba A. et al., Langmuir 1996, 12, 2853–2858, have reported the influence of a series of organic polyphosphonates on hydroxyapatite crystal growth kinetics. U.S. Pat. No. 3,880,764 discloses conventional polymer aqueous drilling fluid containing a scale control additive which can be represented by BHMT.

BHMT has, notwithstanding a standing desire, never found widespread application in industrial water treatment and scale control. While it was known that di-long-alkyl triamino pentamethylene phosphonates showed superior stability under stress conditions including higher temperatures, pressure and humidity, as can e.g. apply in oil drilling application, such use, of the solid BHMT salt form, was practically impossible, or non-economic due to the hygroscopicity of the alkali salts and the calcium salts. BHMT is normally used, and depending upon the pH requirement, as a sodium salt, more exceptionally as a calcium salt. The BHMT deficiency was such that the known solid salts could not be used as such.

It is a first object of this invention to provide solid dry forms of BHMT phosphonic acids for use in scale control application. It is another object of this invention to provide solid BHMT sequestrants and/or inhibitors capable of being used economically under humid and/or adverse ambient (subtropical/tropical) conditions as can apply.

It was now discovered that the foregoing and other objects of this invention can be met by using solid, free-flowing magnesium salts of BHMT, preferably partial magnesium salts. In another aspect, this invention relates to a method of scale control under ambient conditions of relative humidity of at least 30% wherein a solid free-flowing composition is used consisting essentially of a magnesium salt of BHMT having a molar ratio of magnesium to phosphonic acid of from 1:1 to 3:1, preferably of from 1.9:1 to 2.8:1.

Percentages used in this description stand, unless indicated otherwise, for percentage by weight. The term BHMT stands for bis(hexyl)triamino pentamethylene phosphonic acid. The term phosphonic acid, as used throughout the description and claims, in connection with molar ratios refers obviously, and by proper antecedent, to BHMT.

The invention herein relates to solid free-flowing compositions capable of exhibiting useful scale control properties consisting essentially of a magnesium salt of BHMT having a molar ratio of magnesium to phosphonic acid of from 1:1 to 5:1. In one preferred execution, the magnesium salt of BHMT represents, at least, 70% of the composition. The invention also concerns a method of scale control under ambient conditions of relative humidity of, at least, 30% characterized in that one uses a solid free-flowing composition consisting essentially of a magnesium salt of BHMT having a preferred molar ratio of magnesium to phosphonic acid in the range of from 1.9:1 to 2.8:1. More in general, the preferred molar ratios, in connection with the composition aspects of the invention herein, of magnesium to phosphonic acid are generally within the range of from 1:1 to 3:1, preferably in the range of from 1.5:1 to 2.5:1 most preferably of from 1.9:1 to 2.1:1. The partial magnesium salts of BHMT, having e.g. a phosphonic acid/magnesium ratio as set forth in the preceding sentence, can depending upon the use pH requirement of the solid free-flowing product be partially neutralized with alkali cations, preferably sodium, or other suitable neutralizing agents well-known in the art. In one execution, a preferred pH of the solid free-flowing partial magnesium salt is in the range of from 6 to 8, the pH being measured in a 1% by weight solution of the solid product in distilled water at 25° C. The BHMT salt can thus be represented by a magnesium salt having a molar ratio of magnesium to phosphonic acid of 5:1 or by partial magnesium salts which are partially neutralized by other agents such as sodium hydroxide. Inasmuch as the pH of the solid free-flowing magnesium salt shall preferably have a pH (1%; 25° C.) of around 6 to 9 it follows that the sodium ions can neutralize the non-magnesium neutralized acid functions i.e. up to four sodiums with respect to BHMT carrying three magnesiums. But the amount of sodium will vary depending upon the pH of the BHMT magnesium salt solution, which pH is frequently in the range of from 6 to 9. Such final pH optimizations of the BHMT magnesium salt solutions are routine undertakings.

The compositions in accordance with the invention, which can also be used in the method embodiments of the invention, consist essentially, i.e. 50% or more, of the BHMT magnesium salt, preferably at least 70% of the BHMT magnesium salt. The compositions can, in addition, contain minor levels of conventional additives producing, upon use in art established additive levels, a known functionality. Examples of the like additives include solid fillers and diluents, dyes, perfumes and also additive levels, frequently below 30%, usually below 20%, of the composition, of conventional scale inhibitor compounds other than BHMT. Examples of such scale inhibitors which have been commonly used in industrial treatment include polyacrylates and derivatives thereof and polyphosphonates including hydroxyethylidene-1,1 diphosphonate, nitrilotrimethylenephosphonate, sulfonated polyacrylate and phosphinopolycarboxylate. The claimed composition and method technologies can be used in industrial water treatment, detergent and scale inhibition, hardness control in oil drilling operations and particularly in marine oil drilling as a means for controlling barium hardness control. In the method aspect herein, the magnesium—BHMT salt is used in levels generally in the range of from 1 to 1000 ppm, preferably 2 to 300 ppm, more preferably 2 to 100 ppm.

The "70%" level of the BHMT magnesium salt refers to total active BHMT salts in pH adjusted form and thus comprise BHMT and relative BHMT by-products i.e. expresses total active salts measured by acid-base titration.

The hygroscopicity of a series of BHMT salts was compared at 30° C. under conditions of increasing relative humidity (RH); measurements were effected after three hours of exposure. The testing results are as follows:

| Salt | pH | RH % | Remarks |
| --- | --- | --- | --- |
| BHMT $(N_a)_7$ | 7 | 35 | wet and sticky |
|  |  | 45 | syrup |
|  |  | 50 | liquid |
|  |  | 65 | liquid |
| BHMT $(M_g)_2$ | 7 | 35 | free-flowing |
|  |  | 45 | free-flowing |
|  |  | 65 | free-flowing |
| BHMT $M_g$ | 7 | 35 | free-flowing |
|  |  | 45 | traces of surface caking |
| BHMT $(C_a)_{2.5}$ | 10 | 35 | sticky and crusty |

These results show the unusual retention of free-flowing properties of magnesium salts having, for example, a molar ratio of magnesium to phosphonic acid above 1.5:1, preferably in the range of from 2:1 to 3:1.

The invention claimed is:

1. A free-flowing solid composition, capable of exhibiting scale control properties, consisting essentially of a magnesium salt of bis(hexamethylene)triamino penta(methylenephosphonic acid), having a molar ratio of magnesium to phosphonic acid of from 1:1 to 5:1, said salt remaining a free-flowing solid when tested for three hours for hygroscopicity at 30° C. and relative humidity of at least 35%, and wherein the magnesium salt has a pH of 6–9.

2. The composition according to claim 1 wherein the molar ratio of magnesium to phosphonic acid is in the range of from 1:1 to 3:1.

3. The composition according to claim 2 wherein the magnesium salt of the phosphonic acid represents, at least, 70% by weight of the composition.

4. The composition according to claim 3 wherein the molar ratio of magnesium to phosphonic acid is from 1.5:1 to 2.5:1.

* * * * *